(12) United States Patent
Falsafi

(10) Patent No.: US 7,023,819 B2
(45) Date of Patent: Apr. 4, 2006

(54) METHOD FOR REDUCING THE NUMBER OF VOCODERS IN A WIRELESS NETWORK

(76) Inventor: Aram Falsafi, c/o 121 Tremont St. #311, Brighton, MA (US) 02135

( * ) Notice: Subject to any disclaimer, the term of this patent is extended or adjusted under 35 U.S.C. 154(b) by 974 days.

(21) Appl. No.: 10/033,589

(22) Filed: Jan. 2, 2002

(65) Prior Publication Data

US 2002/0054571 A1    May 9, 2002

(51) Int. Cl.
*H04Q 7/20*    (2006.01)

(52) U.S. Cl. .................................. 370/328; 370/356
(58) Field of Classification Search ............ 370/328, 370/356; 379/68
See application file for complete search history.

(56) References Cited

U.S. PATENT DOCUMENTS

| | | | | |
|---|---|---|---|---|
| 5,995,923 A * | 11/1999 | Mermelstein et al. | ....... | 704/219 |
| 6,138,022 A * | 10/2000 | Strawczynski et al. | ..... | 455/445 |
| 6,172,974 B1 * | 1/2001 | Tseng et al. | ................ | 370/357 |
| 6,272,358 B1 * | 8/2001 | Brent et al. | .................. | 455/560 |
| 6,363,339 B1 * | 3/2002 | Rabipour et al. | ........... | 704/201 |
| 6,657,996 B1 * | 12/2003 | Mladenovic et al. | ....... | 370/356 |
| 6,766,291 B1 * | 7/2004 | Chu et al. | .................... | 704/215 |
| 2003/0031200 A1 * | 2/2003 | Lehtimaki | .................... | 370/467 |

FOREIGN PATENT DOCUMENTS

WO    WO 96/19907    * 6/1996

* cited by examiner

*Primary Examiner*—Min Jung

(57) ABSTRACT

A method is proposed for reducing the number of vocoders in a wireless network. In certain wireless networks mechanisms exist for bypassing the encoding and decoding of voice traffic at the base station, when both ends of the call are mobile subscribers. This is known as tandem-free operation. A method is proposed where other elements of the network instruct the base station to bypass the vocoding, even when the other end of the link is not a wireless subscriber. These elements could include a packet-switched network used for backhaul, or a terminating node such as a voicemail platform. The network element instructing the base station to bypass its vocoders will then be responsible for transcoding of the voice data. This eliminates the need for extra stages of vocoding.

6 Claims, 6 Drawing Sheets

A wireless network using a packet-switched network for backhaul of voice traffic. The base station's vocoder is bypassed, and vocoding is done at the interface between the packet-switched network and the PSTN.

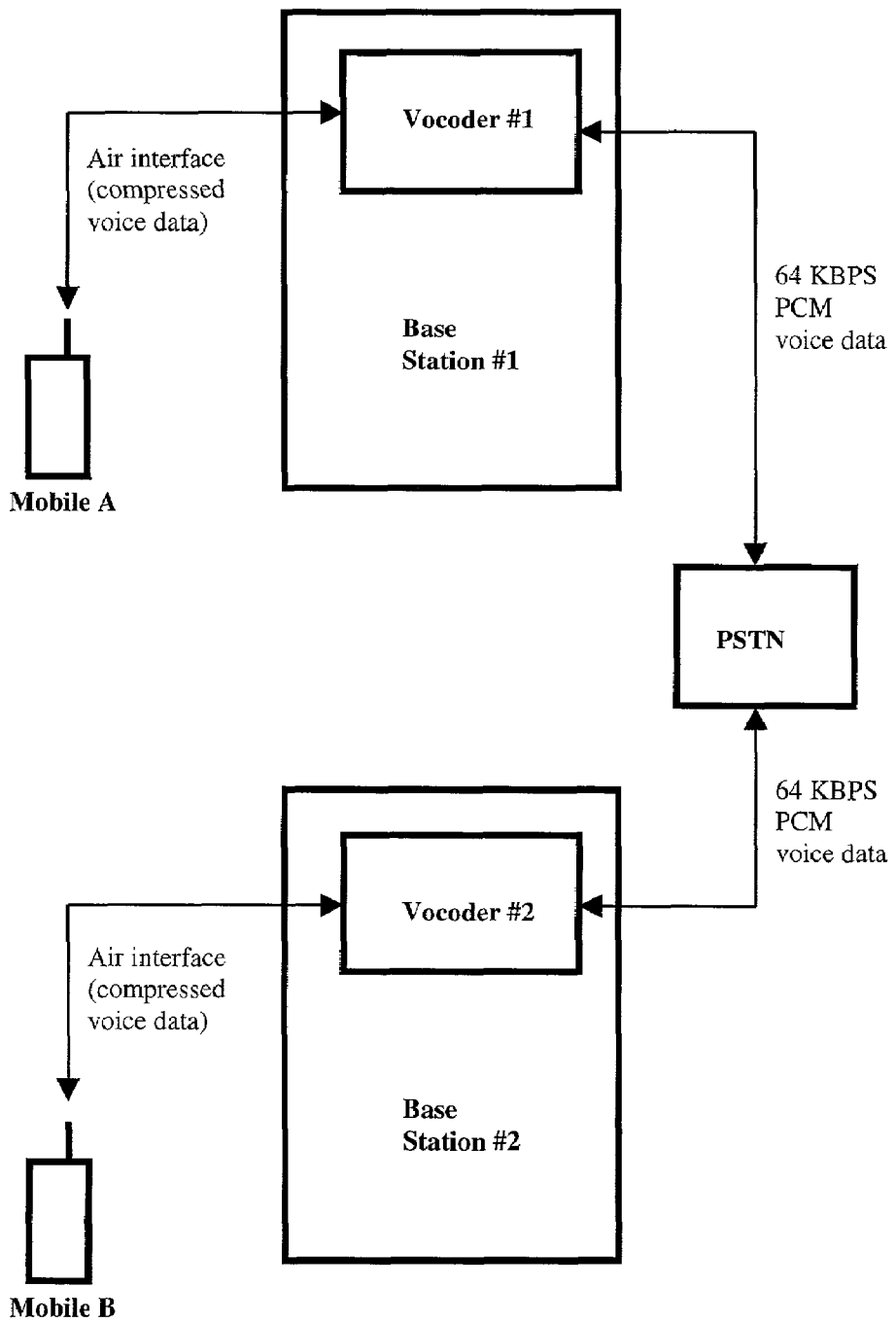
Figure 1. A traditional wireless network using a Public Switched Telephone Network (PSTN) to connect two mobile stations without vocoder bypass.

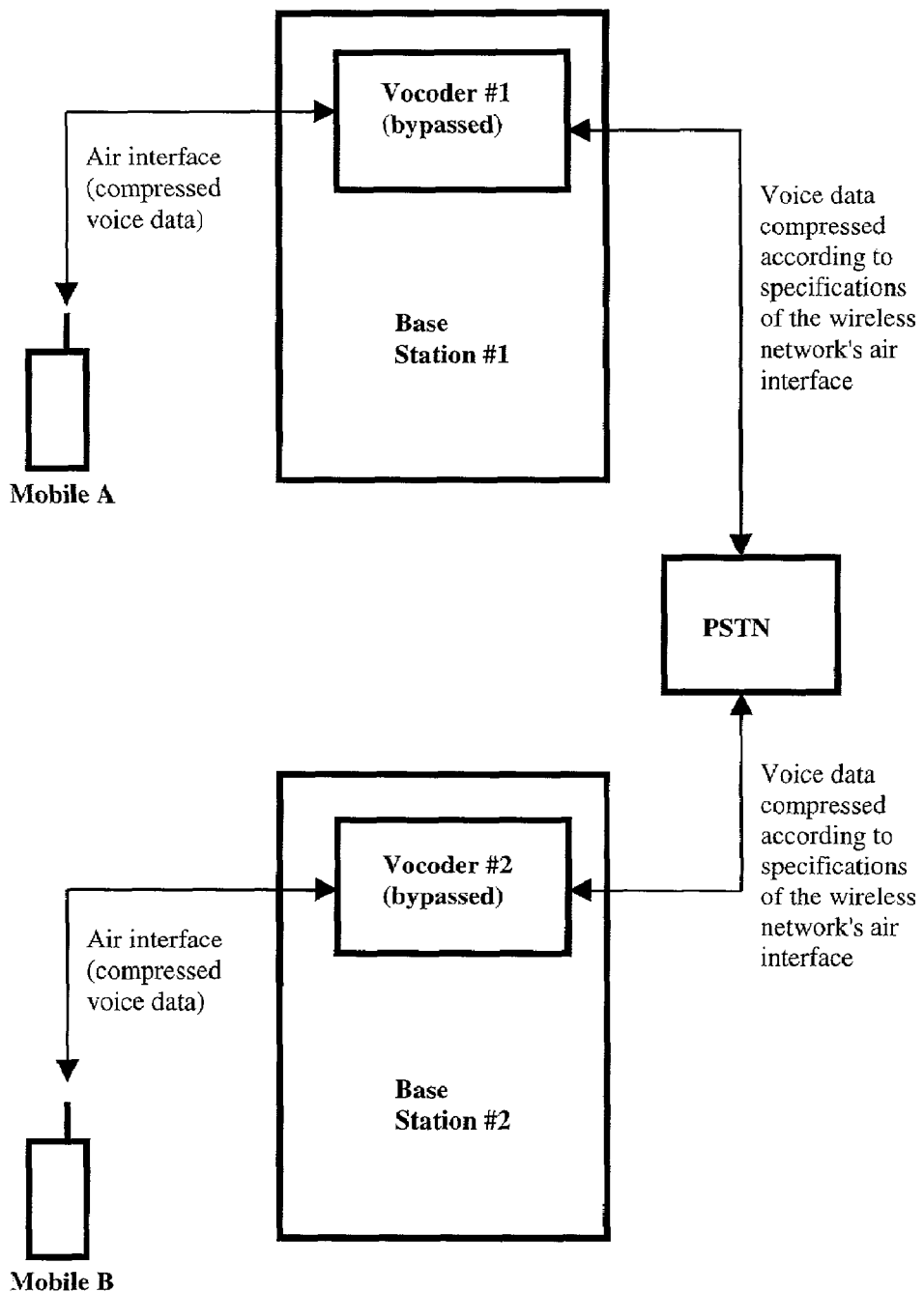
Figure 2. A wireless network using a Public Switched Telephone Network (PSTN) to connect two mobile stations, where the vocoders in the base stations are bypassed.

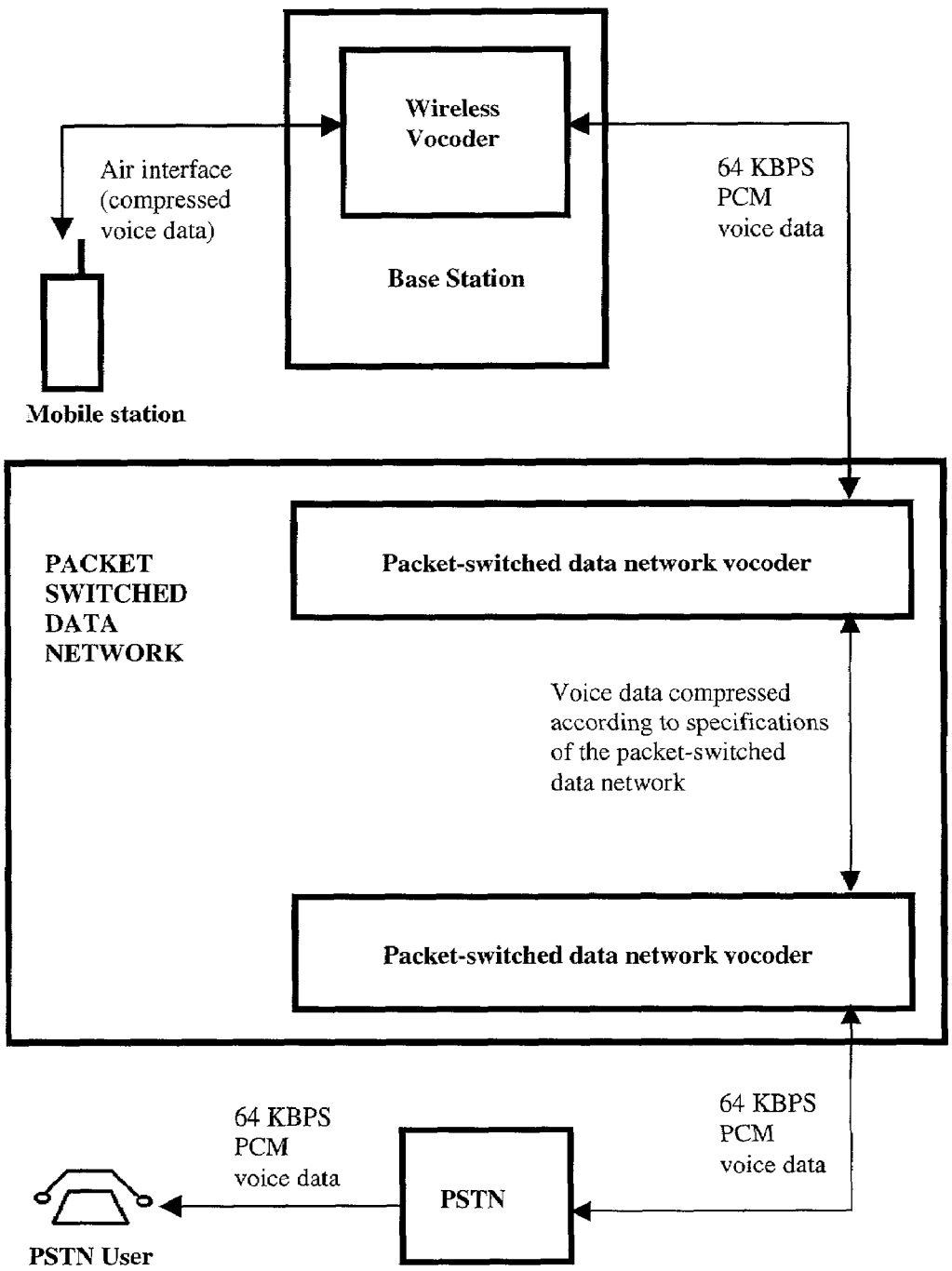
Figure 3. A wireless network using a packet-switched network for backhaul of voice traffic. The packet-switch network's vocoders further degrade voice quality.

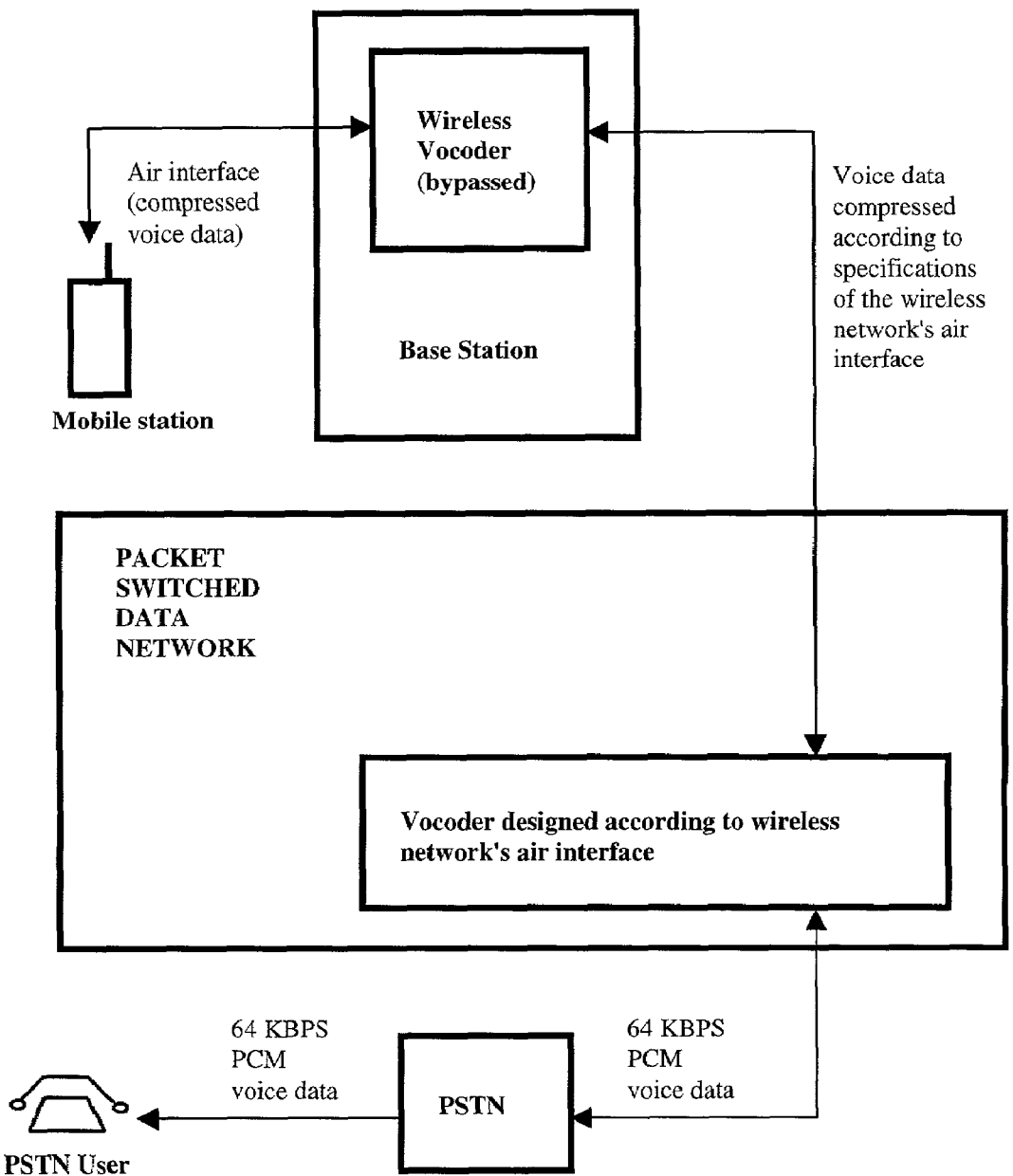
Figure 4. A wireless network using a packet-switched network for backhaul of voice traffic. The base station's vocoder is bypassed, and vocoding is done at the interface between the packet-switched network and the PSTN.

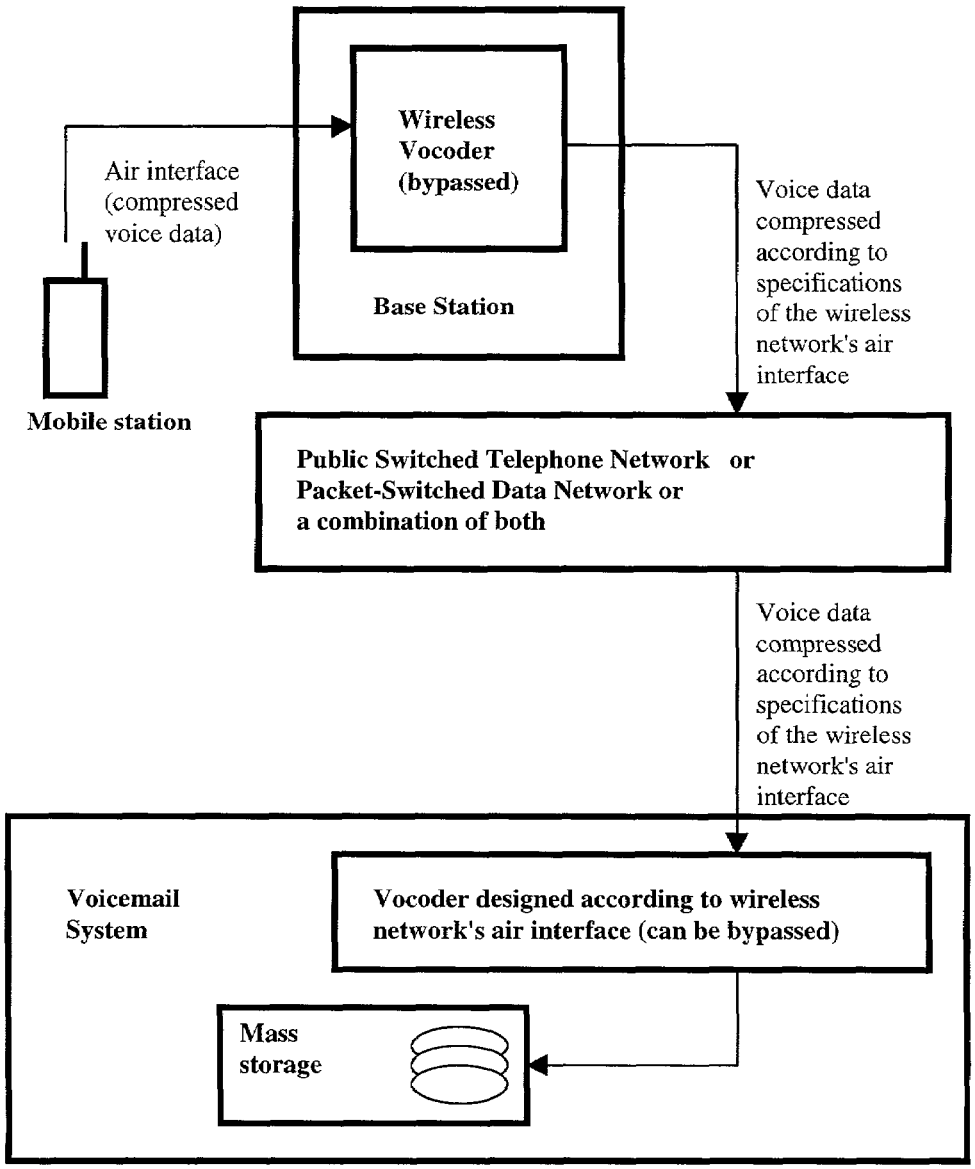
Figure 5. A wireless subscriber leaving a message in a voicemail system. The base station's vocoder is bypassed, and further vocoding may not be required if the voicemail system can store voice data in the format of the wireless network.

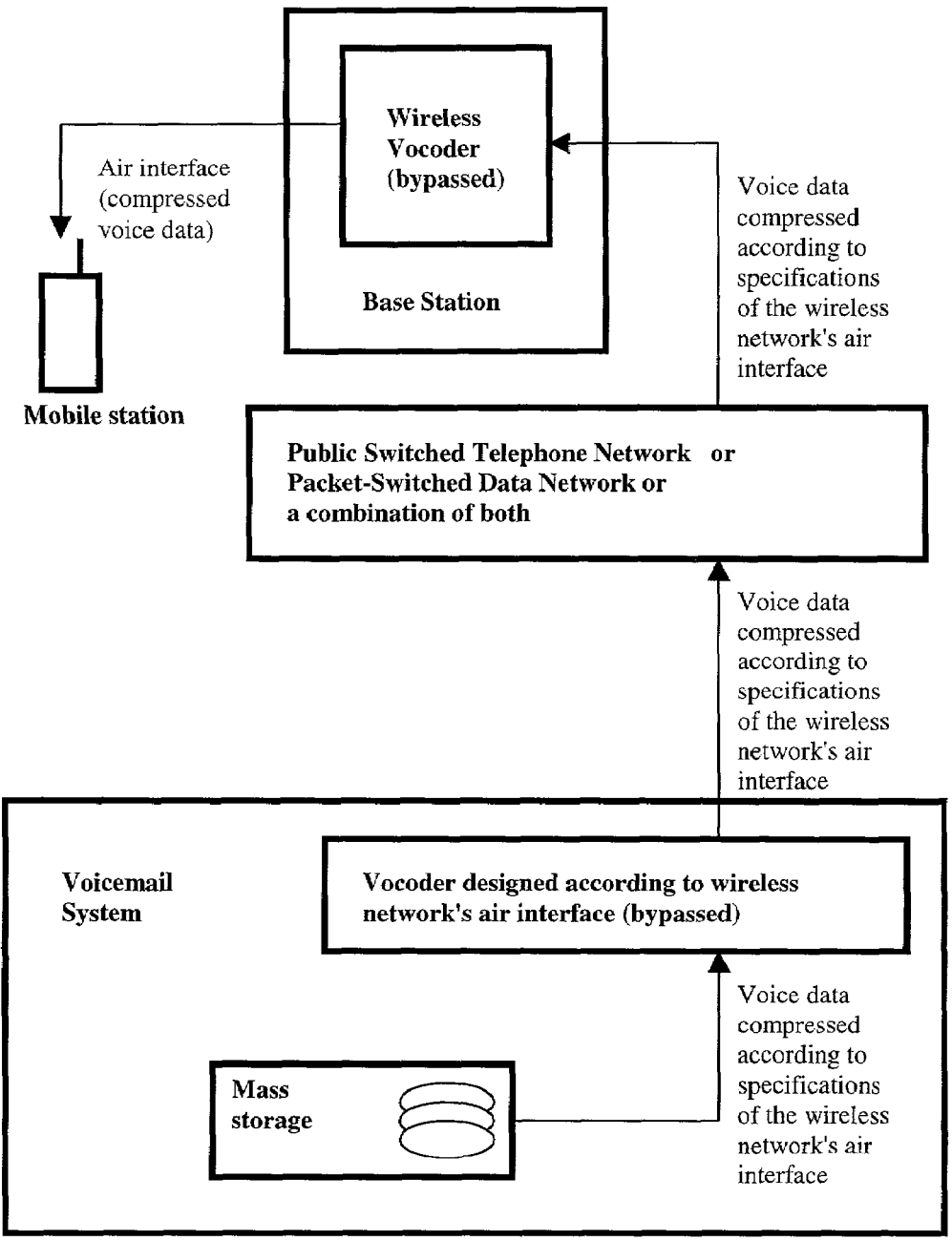
Figure 6. A wireless subscriber calling to retrieve a message from a voicemail system. The base station's vocoder as well as the voicemail system's vocoder are bypassed because the voicemail system has stored voice data in the format of the wireless network's air interface.

METHOD FOR REDUCING THE NUMBER OF VOCODERS IN A WIRELESS NETWORK

CROSS-REFERENCE TO RELATED APPLICATIONS

Cross reference is made to the following: (1) U.S. Pat. No. 5,995,923, entitled "Method and Apparatus for Improving the Voice Quality of Tandemed Vocoders" dated Nov. 30, 1999 (2) International application serial number PCT/CA95/00704 dated Dec. 13, 1995 (3) U.S. Pat. No. 6,172,974 entitled "Network Element Having Tandem Free Operation Capabilities" dated Jan. 9, 2001 (4) U.S. Pat. No. 6,272,358 entitled "Vocoder By-pass for Digital Mobile-to-mobile Calls" dated Aug. 7, 2001.

STATEMENT REGARDING FEDERALLY SPONSORED RESEARCH

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

One of the major problems faced by wireless telecommunications providers is the progressive loss of voice quality as voice data passes through multiple stages of vocoding (voice encoding and decoding). One such example is when a call is placed from one mobile phone to another using today's so-called "second generation" cellular equipment. If the two subscribers are connected to different wireless base station equipment, where the two sets of base station equipment are connected to each other via a Public Switched Telephone Network (PSTN), voice data goes through two encoders and two decoders. It is first encoded at the originating wireless terminal (for example a mobile station). It is then decoded by the base station equipment that the originating wireless terminal is connected to, before passing over the PSTN as pulse code modulated data. It is once again encoded by the base station equipment that the destination wireless terminal is connected to, before being sent over the air. Finally, it is decoded by the destination wireless terminal. There is serious loss of voice quality associated with the successive encoding and decoding of the voice data.

This problem is being addressed by designers of next-generation cellular systems. Two approaches have been proposed. The first approach is to modify the behavior of the two vocoders in the base station equipment (the second and third vocoders in the above example, also known as the tandemed vocoders) in order to minimize the distortion that is introduced. This approach is described in U.S. Pat. No. 5,995,923, entitled "Method and Apparatus for Improving the Voice Quality of Tandemed Vocoders," whose contents are incorporated herein by reference.

Another approach is to use signaling between the two sets of base station equipment in order to bypass the tandemed vocoders completely. This second approach is known as "tandem free operation" and is described in international patent application serial number PCT/CA95/00704 dated Dec. 13, 1995, U.S. Pat. No. 6,172,974 entitled "Network Element Having Tandem Free Operation Capabilities," and U.S. Pat. No. 6,272,358 entitled "Vocoder By-pass for Digital Mobile-to-mobile Calls." The contents of the three references mentioned in the previous sentence are incorporated herein by reference. One implementation of this approach is given in [3GPP2] listed in the REFERENCES section of this application.

BRIEF SUMMARY OF THE INVENTION

A similar problem of voice quality degradation arises when voice data passes from a wireless system, through a packet-switched network, to its final destination, which may be another wireless subscriber, a Public Switched Telephone Network subscriber, or an enhanced services platform such as a voicemail system. Packet-switched networks also use vocoders to compress voice data in order to save on the bandwidth required for transmission of each user's voice signal. This introduces further degradation in the quality of the voice signal. A method is proposed where the packet-switched network takes advantage of the vocoder bypass capability built into the base station equipment, by instructing the base station equipment to bypass its vocoders. The packet-switched network thus sends and receives a compressed voice signal compatible with the encoding of the wireless terminal's air interface standard. This method is covered by claims 1 through 4 of this application.

A second scenario addressed by this invention is when a call is established between a wireless terminal and another terminating node, such as a voicemail system or teleconferencing bridge (the terminating node not being a wireless terminal). A method is proposed where the terminating node can instruct the base station equipment to bypass its vocoders. The terminating node is then responsible for either using its own vocoders that are compatible with the vocoders in the wireless terminals, or processing the voice data in the format that it arrives in. This method is covered by claims 5 and 6 of this application.

BRIEF DESCRIPTION OF THE DRAWINGS

FIG. 1. A traditional wireless network using a Public Switched Telephone Network (PSTN) to connect two wireless terminals (mobile stations). In this system there is no way to bypass the vocoders built into the two base stations.

FIG. 2. A wireless network using a Public Switched Telephone Network (PSTN) to connect two wireless terminals (mobile stations). In this system two of the vocoders are bypassed in order to improve the voice quality.

FIG. 3. A wireless network using a packet-switched network to transfer voice traffic between a wireless terminal (mobile station) and a subscriber connected to the Public Switched Telephone Network (PSTN). The packet-switched network introduces its own vocoders, further degrading voice quality.

FIG. 4. A wireless network using a packet-switched network to transfer voice traffic between a wireless terminal (mobile station) and a subscriber connected to the Public Switched Telephone Network. In this figure, the packet-switched network uses signaling understood by the base station to instruct it to bypass its vocoding stages. Vocoding is then performed by the packet-switched network only at the interface between the packet-switched network and the Public Switch Telephone Network (PSTN).

FIG. 5. A wireless network connecting a wireless terminal (mobile station) to a voicemail system. In this figure, the mobile user is leaving a message in a voicemail box. The voicemail system uses signaling understood by the base station to instruct it to bypass its vocoding stages. The voicemail system then has the option of either decoding the voice data before storing it, or storing the message in the compressed format that the wireless terminal produces.

FIG. 6. A wireless network connecting a wireless terminal (mobile station) to a voicemail system. In this figure, the mobile user is calling to retrieve a message left in his or her voicemail box. The voicemail system had stored the incoming voice message in a format compatible with the wireless terminal's air interface. Therefore, the voicemail system uses signaling understood by the base station to instruct it to bypass its vocoding stages. The voicemail system then outputs the stored message without passing it through any vocoders.

DETAILED DESCRIPTION OF THE INVENTION

The problem addressed by this invention is the following. Wireless voice systems use vocoders in the wireless terminal (for example a mobile unit) as well as in the base station equipment in order to compress the voice data that travels over the air interface, in order to fit more links in a given radio bandwidth. Packet-switched networks such as voice-over-internet or voice-over-ATM (Asynchronous Transfer Mode) systems also use vocoders to compress the voice data in order to fit more voice links in a given packet-switched link. When voice traffic passes from a wireless terminal through the base station equipment, and then through a packet-switched network (and vice-versa), the various stages of encoding and decoding result in degradation in voice quality. Such a system is depicted in FIG. 1.

So-called "third-generation" wireless systems allow for a mechanism to bypass the vocoders if both ends of the link are wireless subscribers. This is known as "tandem-free operation" and one such implementation is described in [3GPP2] listed in the REFERENCES section below. A wireless system supporting tandem-free operation is depicted in FIG. 2. However, tandem-free operation, as described in the prior art mentioned in this application and as implemented in the reference listed below does not address the case where a wireless terminal is communicating with a non-wireless terminal, for example a PSTN subscriber or other terminal equipment that uses uncompressed pulse-code modulated signals or compression algorithms incompatible with that of the wireless terminal. In such systems, there is degradation in voice quality as a result of placing two wireless vocoders (in the wireless terminal and the base station equipment) in tandem with two vocoders of the packet-switched network (at the input and output of the packet-switched network). Such a system is depicted in FIG. 3.

This invention proposes a method whereby a packet-switched network connected to a wireless voice system capable of tandem-free operation can invoke the vocoder bypass capability of the base station equipment for calls that go through the packet-switched network, essentially pretending that the final destination of the call is another wireless terminal. This method is covered by claims 1 through 4 of this application. A system implementing this method is depicted in FIG. 4.

In such a scenario, in the uplink direction (wireless terminal to packet-switched network) compressed voice data travels from the wireless terminal through the base station equipment and through as much of the packet-switched network as possible. The compressed voice data is decoded and decompressed by the packet-switched network only when needed, for example just before going from the packet-switched network to the Public Switched Telephone Network (PSTN) or to other terminating equipment that uses uncompressed pulse code modulated signals to represent voice.

In the downlink (packet-switched network to wireless terminal) direction, the voice data is encoded at some point after entering the packet-switched network, but before reaching the wireless equipment. Preferably the encoding happens as soon as the voice data enters the packet-switched network, in order to take full advantage of the compression resulting from the encoding.

The resulting voice signal is less degraded than one that has to go through the extra encoding and decoding stages of a packet-switched network, as well as a vocoder stage in the wireless terminal and another vocoder in the base station.

The packet-switched network will need to use a compression format that is bit-for-bit compatible with the base station equipment that it is connected to. For example, when its vocoder is in bypass mode, the base station equipment's interface to the packet-switched network may still be a 64 kilobits-per-second (KBPS) signal, where the compressed voice signal occupies a fraction of the 64 KBPS bandwidth. Such an interface is specified in the 3GPP2 specification being developed as the next-generation code-division multiple access (CDMA) standard. For further information see [3GPP2] in the REFERENCES section below.

Please note that the Public Switched Telephone Network (PSTN) depicted in FIG. 4 can be replaced by any system that uses pulse code modulation to represent voice data.

This application also proposes a method for terminal equipment that are not wireless terminals (for example enhanced services platforms such as voicemail systems) to take advantage of the vocoder bypass capabilities of wireless base station equipment. The terminal equipment will invoke the vocoder bypass capability of the base station equipment for calls that are destined for the terminal equipment, pretending that the final destination of the call is another wireless terminal. The terminal equipment will then send and receive voice data encoded according to the specifications of the wireless system. The terminal equipment can either process the voice data in the format of the wireless network, or it can use vocoders to transfer the voice data to and from other formats. One example of such a system is depicted in FIG. 5, where a wireless terminal user is leaving a message in a voicemail box. The voice traffic arrives at the voicemail system encoded according to the specifications of the wireless terminal's air interface standard. The voicemail system has the option of either storing the voice data without decoding first, or decoding the voice data and then storing it.

FIG. 6 depicts a wireless user calling into a voicemail system to retrieve a message. Since the voicemail message had been stored in a format compatible with the vocoding standard of the wireless system's air interface, the voicemail system will need to notify the wireless terminal's base station equipment to bypass its vocoder. The voicemail system will then output the voice data without passing it through its own vocoder.

In the case where the voicemail message was stored in a format other than that of the wireless system's air interface standard (for example as pulse code modulated data or compressed using an algorithm proprietary to the voicemail system), the voicemail system must first convert the voice data into the format compatible with the wireless terminal's air interface standard if the base station equipment's vocoder bypass capabilities are to be invoked. Alternatively, the voicemail system can output a pulse code modulated signal and not instruct the base station equipment to bypass its vocoders.

REFERENCES

3GPP2 Tandem Free Operation Specification—Release A, July 2001, available for download from www.3gpp2.org/Public_html/specs/A.S0004-A_Release_A_v1.0.pdf

The invention claimed is:

1. A telecommunication system including one or more wireless base stations, and one or more packet-based networks;
 where the term "base station" refers to fixed wireless equipment that is connected to a telecommunications network, and may include a combination of Base Transceiver Stations (BTS), Base Station Controllers (BSC), and Mobile Switching Centers (MSC);
 where each of said base stations is used to establish radio-frequency communication with one or more wireless terminals over an air interface, each of said base stations being capable of exchanging with one or more wireless terminals, data packets of compressed audio information;
 where said packet networks use the internet protocol to transfer voice data to and from said wireless terminals;
 where said base stations include vocoders that decode into Pulse Code Modulation the voice traffic received from said wireless terminals;
 where said base stations include vocoders that encode Pulse Code Modulated voice traffic destined for said wireless terminals into the format specific to said wireless terminals' air interface;
 where said base stations have a mechanism for bypassing the encoding and decoding of voice traffic going to and coming from said wireless terminals, respectively;
 where said packet networks connect to one or more Public Switched Telephone Networks or other telecommunication equipment that uses Pulse Code Modulation for representation of voice traffic;
 where said packet networks are capable of instructing the vocoders in said base stations to bypass the encoding and decoding of voice traffic going to and coming from said wireless terminals respectively, said encoding and decoding being performed by said packet networks as needed.

2. A telecommunication network as defined in claim 1, wherein said packet network is an Asynchronous Transfer Mode (ATM) network.

3. A telecommunication network as defined in claim 1, wherein said base stations also include echo cancellers wherein;
 said packet networks can instruct said base stations to also disable the echo cancellers corresponding to said vocoders when said vocoders are being bypassed.

4. A telecommunication network as defined in claim 3, wherein said packet networks are Asynchronous Transfer Mode (ATM) networks.

5. A telecommunication network including one or more wireless base stations, and one or more nodes;
 where the term "base station" refers to fixed wireless equipment that is connected to a telecommunications network, and may include a combination of Base Transceiver Stations (BTS), Base Station Controllers (BSC), and Mobile Switching Centers (MSC);
 where each of said base stations is used to establish radio-frequency communication with one or more wireless terminals over an air interface, each of said base stations being capable of exchanging with one or more wireless terminals, data packets of compressed audio information;
 where said nodes can be used to receive calls from said wireless terminals and to place calls to said wireless terminals;
 where said nodes are not wireless terminals;
 where said base stations include vocoders that decode into Pulse Code Modulation the voice traffic received from said wireless terminals;
 where said base stations include vocoders that encode Pulse Code Modulated voice traffic destined for said wireless terminals into the format specific to said wireless terminals' air interface;
 where said base stations have a mechanism for bypassing the encoding and decoding of voice traffic going to and coming from said wireless terminals, respectively;
 where said nodes are capable of instructing the vocoders in said base stations to bypass the encoding and decoding of voice traffic going to and coming from said wireless terminals respectively, said encoding and decoding being performed by said nodes as needed.

6. A telecommunication network as defined in claim 5, wherein said base station equipment also includes echo cancellers wherein;
 said nodes can instruct said base stations to also disable the echo cancellers corresponding to said vocoders when said vocoders are being bypassed.

* * * * *